United States Patent
Kennedy et al.

(10) Patent No.: US 8,381,302 B1
(45) Date of Patent: Feb. 19, 2013

(54) SYSTEMS AND METHODS FOR TRANSLATING NON-COMPARABLE VALUES INTO COMPARABLE VALUES FOR USE IN HEURISTICS

(75) Inventors: Mark Kennedy, Redondo Beach, CA (US); Abubakar Wawda, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 722 days.

(21) Appl. No.: 12/558,845

(22) Filed: Sep. 14, 2009

(51) Int. Cl.
*G06F 21/00* (2006.01)

(52) U.S. Cl. ............................... 726/24; 726/23; 726/25

(58) Field of Classification Search ............. 726/23–25; 706/45–48; 707/698, 747
See application file for complete search history.

(56) References Cited

U.S. PATENT DOCUMENTS

| | | | | |
|---|---|---|---|---|
| 7,028,022 | B1 * | 4/2006 | Lightstone et al. | 1/1 |
| 7,624,446 | B1 * | 11/2009 | Wilhelm | 726/23 |
| 7,660,865 | B2 * | 2/2010 | Hulten et al. | 709/207 |
| 7,711,719 | B1 * | 5/2010 | Waldin et al. | 707/696 |
| 8,024,719 | B2 * | 9/2011 | Gorton, Jr. | 717/158 |
| 8,185,745 | B2 * | 5/2012 | Singh et al. | 713/180 |
| 2004/0199773 | A1 * | 10/2004 | Radatti et al. | 713/176 |
| 2005/0091321 | A1 * | 4/2005 | Daniell et al. | 709/206 |
| 2008/0294678 | A1 * | 11/2008 | Gorman et al. | 707/102 |

* cited by examiner

*Primary Examiner* — Carl Colin
*Assistant Examiner* — Chau Le
(74) *Attorney, Agent, or Firm* — Advantedge Law Group (57) ABSTRACT

An exemplary method for translating non-comparable values into comparable values for use in heuristics may include: 1) identifying a data object, 2) identifying a non-comparable value associated with the data object, 3) translating the non-comparable value into a comparable value, and then 4) processing the comparable value in a heuristic. In some examples, the heuristic may include a malware-detection heuristic, such as a decision tree.

14 Claims, 6 Drawing Sheets

Frequency Table 122

| Hash | Number of Occurrences | Prevalence Rank |
|---|---|---|
| 12345 | 1,230 | 0 |
| 23456 | 949 | 1 |
| 34567 | 875 | 2 |
| 45678 | 796 | 3 |
| 56789 | 594 | 4 |
| 67890 | 301 | 5 |
| 78901 | 102 | 6 |

SYSTEMS AND METHODS FOR TRANSLATING NON-COMPARABLE VALUES INTO COMPARABLE VALUES FOR USE IN HEURISTICS

BACKGROUND

Decision trees and other heuristics are commonly used as predictive models to map observations about an item with conclusions about the item's target value. For example, a security-software vendor may use decision trees as predictive models for identifying or detecting malicious computer files ("malware") based on attributes, characteristics, and/or behaviors of the files.

Decision trees and other heuristics typically classify a sample by determining whether the sample satisfies various comparable criteria (such as sizes and counts). For example, a malware-detection decision tree may determine that a file represents a malicious file if the file, among other behaviors or characteristics: 1) instantiates less than two visible processes, 2) has a file size that is greater than 7740 KB, 3) generates less than three icons, and/or 4) has a folder depth of greater than four.

However, decision trees and other heuristics are typically unable to interpret non-comparable values, such as discrete, non-related numeric values, associated with samples. For example, a malware-detection decision tree is typically unable to draw conclusions about the legitimacy of a file simply by comparing a hash of the file with a predetermined hash value since these hash values are generally unrelated and non-comparable. For example, a decision-tree branch having the statement "file hash ≦6967CF" generally has no meaning or significance since any given file may have a hash value that is less than or equal to "6967CF" and this fact typically has no bearing on whether the file is malicious.

As such, the instant disclosure identifies a need for systems and methods for translating non-comparable values (such as file hashes) into comparable values for consumption by decision trees and other heuristics.

SUMMARY

As will be described in greater detail below, the instant disclosure generally relates to systems and methods for translating non-comparable values into comparable values for use in heuristics. In one example, one or more of the systems described herein may accomplish this task by: 1) identifying a non-comparable value associated with a data object (such as a file), 2) translating the non-comparable value into a comparable value, and then 3) processing the comparable value in a heuristic, such as a malware-detection decision tree.

In some examples, the data object may represent a file and the non-comparable value may represent a hash of at least a portion of the file. In this example, the systems described herein may translate the non-comparable value into a comparable value by replacing the hash with a prevalence rank that identifies the prevalence of the hash relative to other file hashes within a corpus of samples (such as a set of training data and/or field data). For example, the systems described herein may: 1) access a hash-frequency table that identifies the frequency of occurrence of each of a plurality file hashes within a corpus of samples, 2) determine, by analyzing the hash-frequency table, the prevalence of the hash relative to other file hashes within the hash-frequency table, 3) assign a prevalence rank to the hash based on the prevalence of the hash relative to the other file hashes within the hash-frequency table, and then 4) replace the hash in question with its associated prevalence rank.

In one example, the systems described herein may create this hash-frequency table by: 1) generating at least one file hash for each file within the corpus of samples, 2) determining the frequency of occurrence of each file hash, 3) sorting the file hashes based on their frequency of occurrence, and then 4) assigning a prevalence rank to each file hash based on the prevalence of the file hash relative to the other file hashes within the hash-frequency table. In some examples, file hashes that occur less than a predetermined number of times may be removed from the hash-frequency table.

By translating non-comparable values (such as, for example, file hashes) into comparable values, the systems and methods described herein may enable decision trees and other heuristics to analyze traditionally non-comparable values without having to pre-process data samples and/or otherwise modify the underlying algorithms or formulas used to create the decision trees. As such, these systems and methods may effectively generate or identify new attributes for data objects (such as file-hash prevalence attributes) that may be useful, for example, in detecting or identifying malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for translating non-comparable values into comparable values for use in heuristics. The term "heuristic algorithm," or often simply "heuristic," as used herein, generally refers to any type or form of algorithm, formula, model, or tool that may be used to classify, or make decisions with respect to, an object or sample. In some examples, the various heuristics described herein may represent, without limitation, decision trees and other algorithms designed to detect and/or identify malware.

Figure 1:
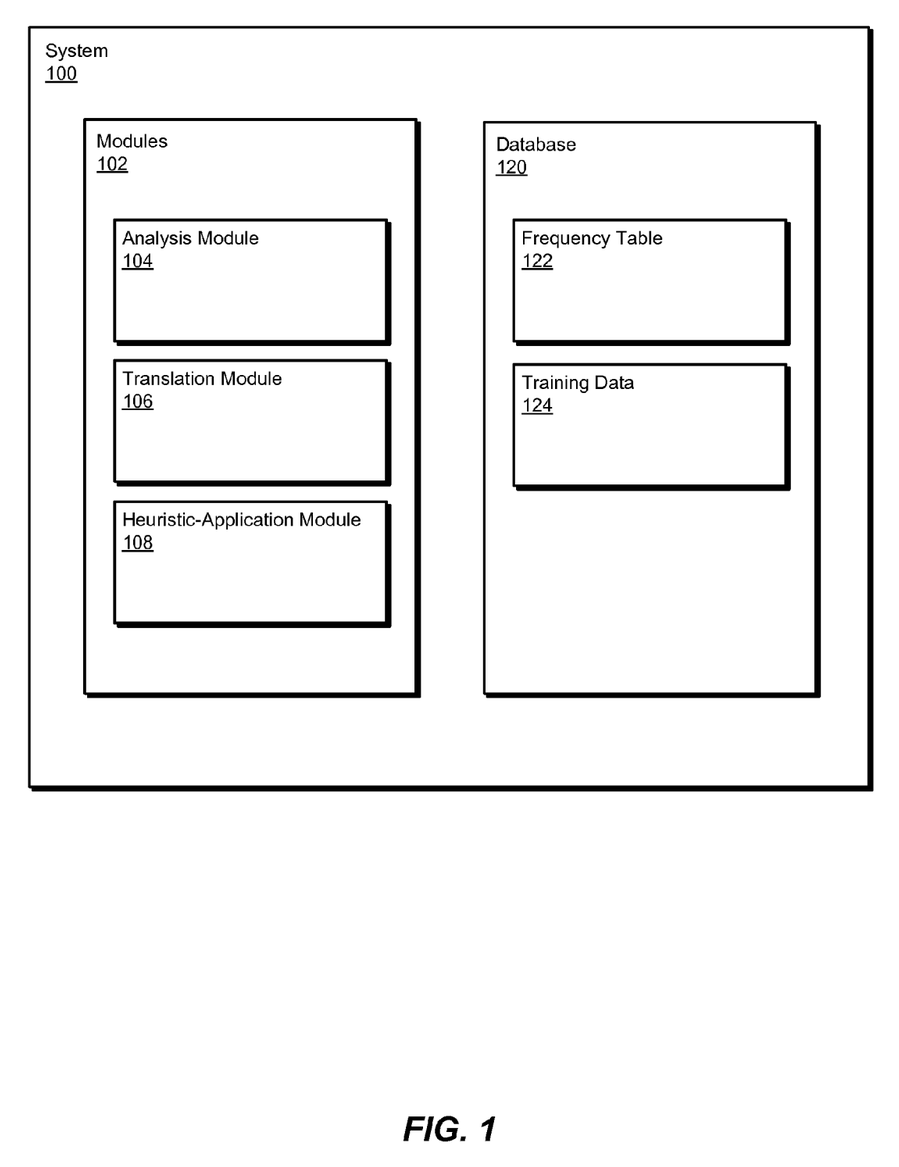
FIG. 1 is a block diagram of an exemplary system for translating non-comparable values into comparable values for use in heuristics.
Figure 2:
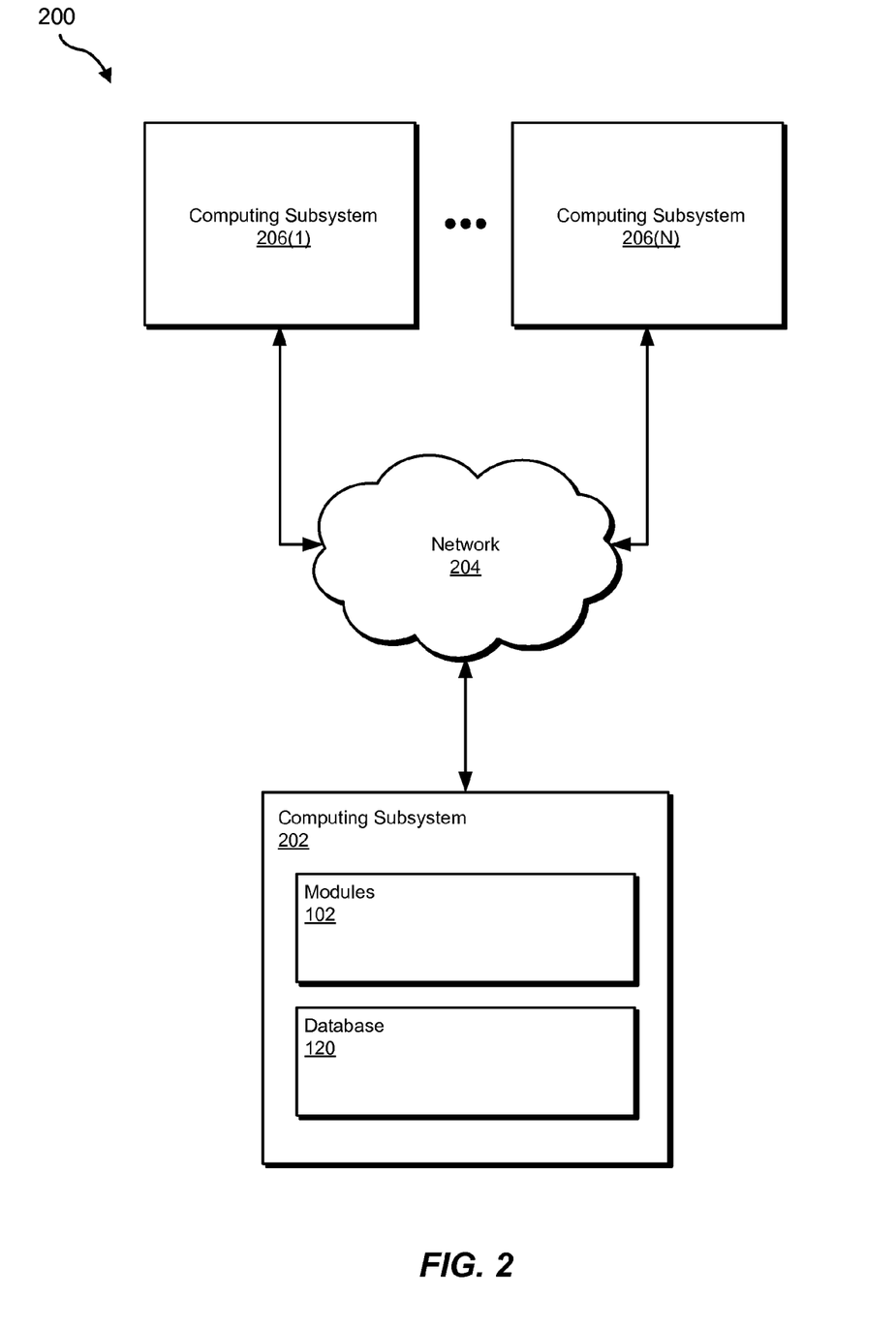
FIG. 2 is a block diagram of an exemplary system for translating non-comparable values into comparable values for use in heuristics.

The following will provide, with reference to FIGS. 1-2, detailed descriptions of exemplary systems for translating non-comparable values into comparable values for use in heuristics. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for translating non-comparable values into comparable values for use in heuristics, As illustrated in this figure, exemplary system 100 may include one or more modules 102 for performing one or more tasks. For example, and as will be explained in greater detail below, exemplary system 100 may include an analysis module 104 programmed to identify non-comparable values associated with data objects (such as hashes of files). Exemplary system 100 may also include a translation module 106 programmed to translate these non-comparable values into comparable values for use in heuristics.

In addition, and as will be described in greater detail below, exemplary system 100 may include a heuristic-application module 108 programmed to process such comparable values in heuristics. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystem 202 and/or computing subsystems 206(1)-206(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include at least one database 120. In one embodiment, database 120 may be configured to store a frequency table 122 that identifies the frequency of occurrence of each of a plurality file hashes within a corpus of samples, as will be explained below. Database 120 may also be configured to store training data 124. As will be explained in greater detail below, training data 124 may represent a corpus of known samples (such as a corpus known files) that may be used to train heuristics.

Database 120 may represent a portion of a single database or computing device or a plurality of databases or computing devices. For example, database 120 may represent a portion of computing subsystem 202 and/or computing subsystems 206(1)-206(N) in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing subsystems 202 and 206(1)-206(N) in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, exemplary system 200 may include a computing subsystem 202 in communication with a plurality of additional computing subsystems 206(1)-206(N) via a network 204. In one embodiment, and as will be described in greater detail below, modules 102 in FIG. 2 may cause computing subsystems 202 and/or 202(1)-(N) to: 1) identify a non-comparable value associated with a data object (such as a file encountered by a malware-detection heuristic), 2) translate the non-comparable value into a comparable value, and then 3) process the comparable value in a heuristic, such as a malware-detection decision tree.

Computing subsystems 202 and 206(1)-206(N) generally represent any type or form of computing device capable of reading computer-executable instructions. Examples of computing subsystems 202 and 206(1)-206(N) include, without limitation, laptops, desktops, servers (application servers and database servers configured to provide various database services and/or run certain software applications), cellular phones, personal digital assistants (PDAs), multimedia players, embedded systems, combinations of one or more of the same, exemplary computing system 510 in FIG. 5, or any other suitable computing device.

In one example, computing subsystem 202 may represent a server or backend configured to create and deploy heuristics to computing subsystems 206(1)-206(N). In this example, computing subsystems 206(1)-206(N) may represent all or a portion of a single community or a plurality of communities. For example, computing subsystems 206(1)-206(N) may represent computing systems within a single or a plurality of user bases, a single or a plurality of enterprises, or portions or combinations of one or more of the same.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing subsystem 202 and computing subsystems 206(1)-206(N).

Figure 3:
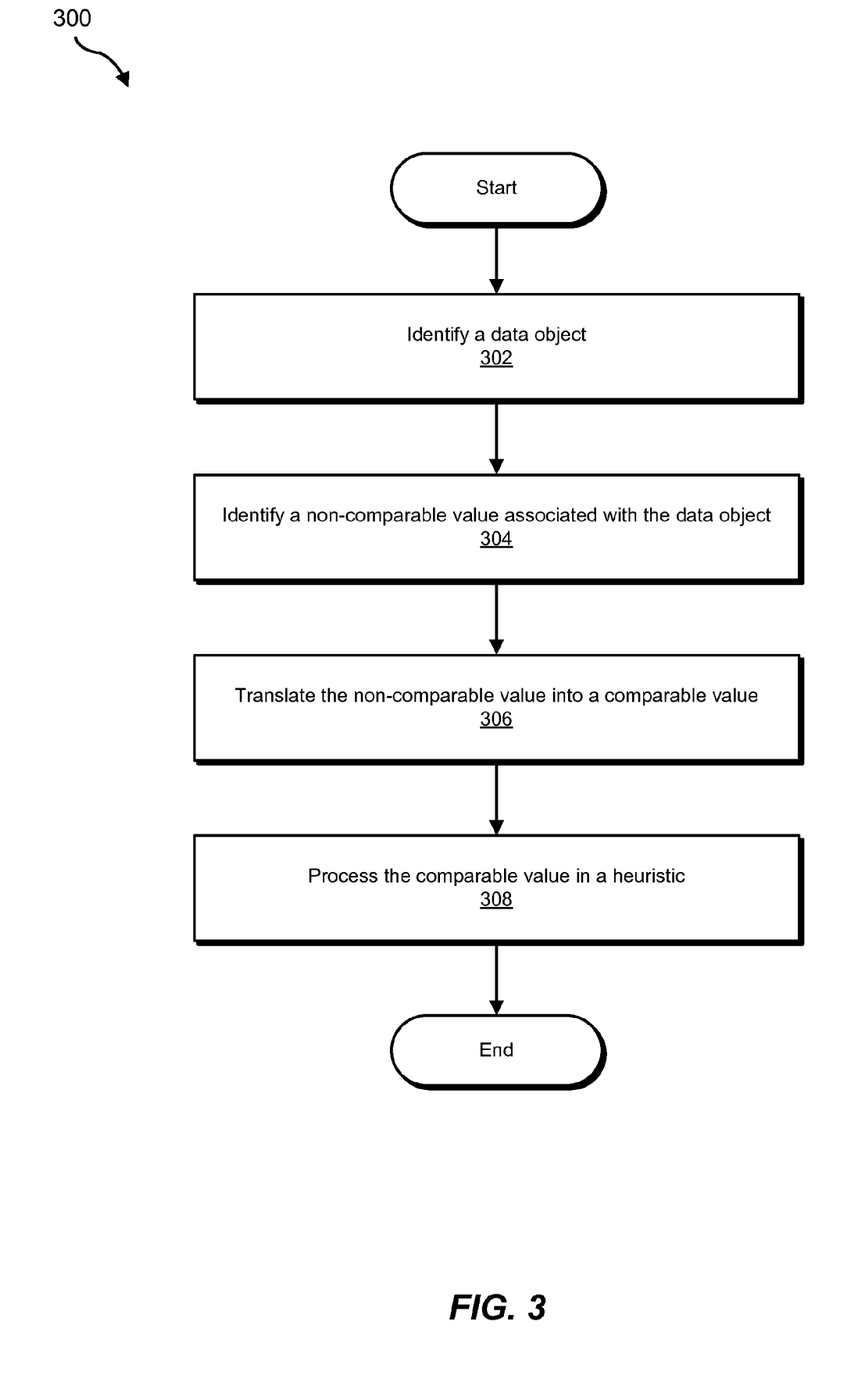
FIG. 3 is a flow diagram of an exemplary method for translating non-comparable values into comparable values for use in heuristics.

FIG. 3 is a flow diagram of an exemplary computer-implemented method 300 for translating non-comparable values into comparable values for use in heuristics. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one more of the various systems described herein may identify a data object. For example, analysis module 104 in FIG. 1 (which may, as detailed above, represent a portion of computing subsystems 202 and/or 206(1)-(N) in FIG. 2) may identify a data object encountered by computing system 202 and/or computing subsystems 206(1)-(N).

Analysis module 104 may perform step 302 in a variety of contexts. In one example, analysis module 104 may represent a portion of a heuristic. As detailed above, this heuristic may represent a malware-detection heuristic (such as a decision tree) configured to detect and identify malware. Such heuristics may be trained and refined using a corpus of known samples (e.g., training data 124 in FIG. 1). For example, heuristic-application module 108 in FIG. 1 (which may, as detailed above, represent a portion of computing subsystem 202 in FIG. 2) may train a heuristic by applying the heuristic to training data 124 in FIG. 1 (which may represent a corpus of samples containing known-malicious files and known-legitimate files) in a controlled environment, such as a computer lab. In this example, analysis module 104 may identify a data object in step 302 when the heuristic encounters the data object within training data 124 (i.e., when the heuristic is applied to the data object).

In other examples, analysis module 104 may identify or encounter a data object during deployment of a heuristic. As detailed above, in one example computing subsystem 202 in FIG. 2 may represent a server or backend configured to train and deploy heuristics to computing subsystems 206(1)-(N), which may, as detailed above, represent all or a portion of a single community or a plurality of communities (such as an enterprise or software user base). In this example, analysis module 104 may identify a data object in step 302 when a heuristic deployed on computing subsystems 206(1)-(N) encounters a data object loaded onto or stored on computing subsystems 206(1)-(N).

The term "data object," as used herein, generally refers to any type or form of data structure. Examples of data structures include, without limitation, files, shared libraries, data blocks, or any other form of data.

Returning to FIG. 3, at step 304 the systems described herein may identify a non-comparable value associated with the data object identified in step 302. For example, analysis module 104 in FIG. 1 may, as part of computing subsystem 202 in FIG. 2, identify a non-comparable value associated with a file encountered by computing subsystem 202 within training data 124. Alternatively, analysis module 104 may, as part of computing subsystem 206(1) in FIG. 2, identify a non-comparable value associated with a file encountered by a heuristic deployed on computing subsystem 206(1).

The non-comparable value identified in step 304 may represent any type or form of non-comparable value. In one example, this non-comparable value may represent a hash of at least a portion of the file identified in step 302. For example, analysis module 104 may generate a hash (e.g., an MD5 or SHA hash) of one or more portions or regions of the file identified in step 302. In this example, this file hash may represent the non-comparable value identified in step 304.

In another example, the non-comparable value may represent the most-commonly occurring byte within a region of a file. For example, in one class of files the letter "A" (represented, for example, as ASCII code 65) may represent the most commonly occurring byte within a specific region of a file. However, in another class of files, the letter "B" (represented, for example, as ASCII code 66) may represent the most commonly occurring byte within a specific region of a file. In this example, the letters "A" (ASCII code 65) and "B" (ASCII code 66) may represent non-comparable values since the statement "ASCII code 65>ASCII code 66" has no meaning.

Returning to FIG. 3, at step 306 the systems described herein may translate the non-comparable value identified in step 304 into a comparable value. For example, translation module 106 in FIG. 1 may, as part of computing subsystem 202 in FIG. 2, translate a non-comparable value associated with a file encountered within training data 124 into a comparable value. Alternatively, translation module 106 may, as part of computing subsystem 206(1) in FIG. 2, translate a non-comparable value associated with a file encountered by a heuristic deployed on computing subsystem 206(1) into a comparable value.

As detailed above, in some embodiments the non-comparable value identified in step 304 may represent a hash of at least a portion or region of a file. In this example, translation module 106 may translate this typically non-comparable hash value into a comparable value by replacing the file hash with a prevalence rank that identifies the prevalence of the hash relative to other file hashes within a corpus of samples (e.g., training data 124). To accomplish this, translation module 106 may first create a hash-frequency table that identifies the frequency of occurrence of each file hash within a corpus of samples. In one example, translation module 106 may build or generate such a hash-frequency table by: 1) identifying a plurality of files within a corpus of samples (e.g., training data 124), 2) generating at least one file hash for each file within the corpus of samples (e.g., generating a hash of all or merely specific regions of each file within the corpus), 3) determining the frequency of occurrence of each file hash, 4) sorting the file hashes based on their frequency of occurrence, and then 5) assigning a prevalence rank to each file hash based on the prevalence of the file hash relative to the other file hashes within the hash-frequency table.

Figure 4:
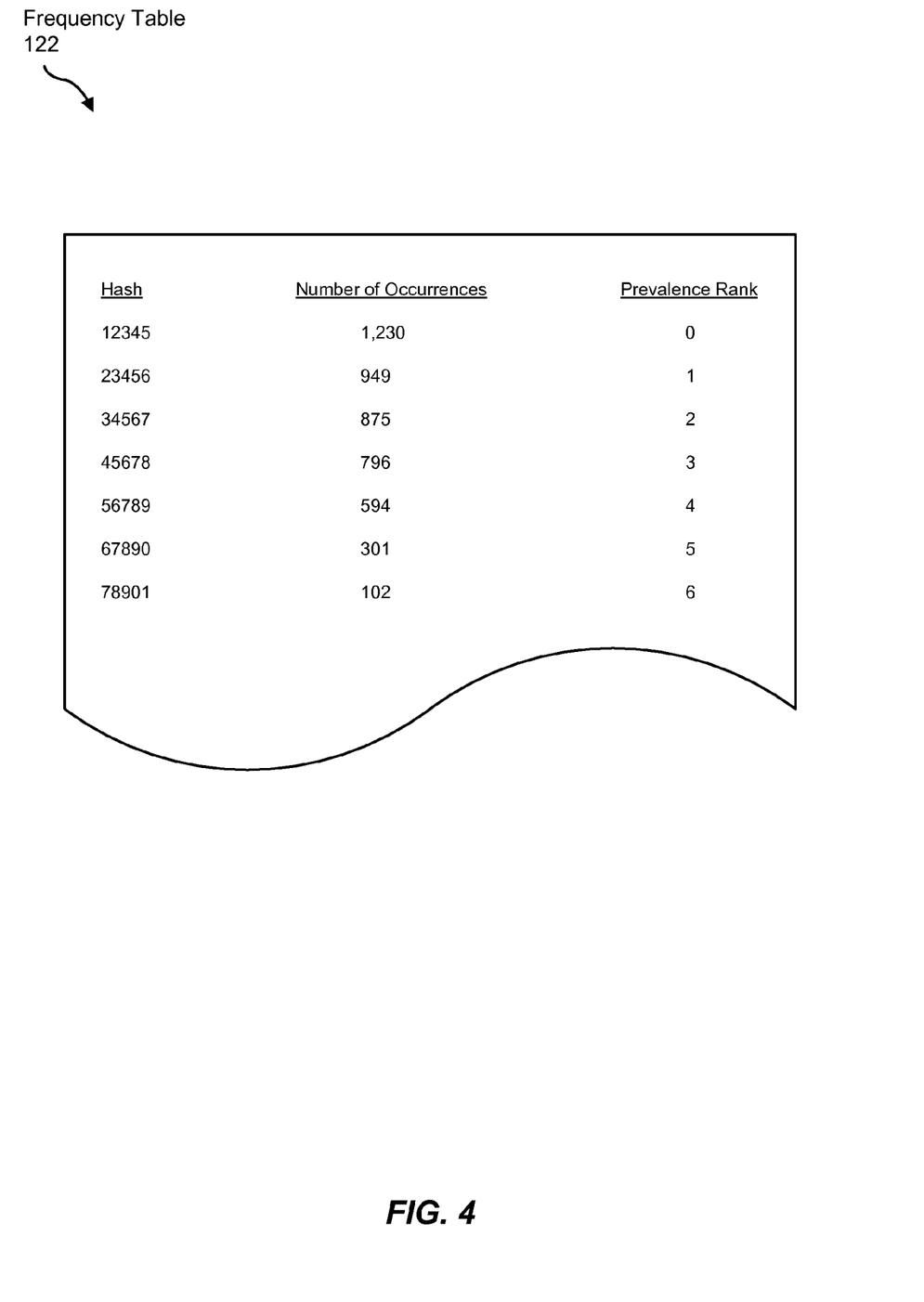
FIG. 4 is an illustration of an exemplary frequency table that identifies the frequency of occurrence of a plurality file hashes within a corpus of samples.

For example, as illustrated in FIG. 4, translation module 106 may generate a frequency table 122 that identifies each file hash encountered within training data 124 (e.g., hash "12345," hash "23456," hash "34567," hash "45678," hash "56789," hash "67890," and hash "78901"). In this example, translation module 106 may enumerate the number of instances of each hash that occur within training data 124. For example, translation module 106 may determine that there are: 1) 1,230 occurrences of hash "12345" within training data 124, 2) 949 occurrences of hash "23456" within training data 124, and so on for each hash encountered within training data 124.

Upon determining the frequency of occurrence of each file hash within training data 124, translation module 106 may sort these file hashes based on their frequency of occurrence. For example, as illustrated in FIG. 4, translation module 106 may sort the various file hashes contained within frequency table 122 in descending order based on the number of occurrences of each file hash within training data 124. Upon sorting these file hashes, translation module 106 may assign a prevalence rank to each file hash based on the prevalence of the file hash relative to the other file hashes within frequency table 122. For example, translation module 106 may assign a prevalence rank of "0" to hash "12345" since this hash represents the most prevalent file hash within training data 124. Similarly, translation module 106 may assign a prevalence rank of "1" to hash "23456" since this hash represents the second-most prevalent file hash within training data 124.

In some examples, translation module 106 may, when creating frequency table 122, remove hashes from frequency table 122 that occur less than a predetermined number of times. For example, translation module 106 may remove all file hashes from frequency table 122 that occur less than five times within training data 124.

In the context of the above example, translation module 106 may translate a traditionally non-comparable file hash associated with a file into a comparable value in step 306 by: 1) accessing frequency table 122, 2) identifying, by analyzing frequency table 122, a prevalence rank assigned to this file hash, and then 3) replacing this file hash with its associated prevalence rank. For example, if, at step 304, analysis module 104 generates the hash "23456" for a specific region of a file identified in step 302, then in step 306 translation module 106 may locate hash "23456" within frequency table 122 and identify a prevalence rank associated with this file hash (in this example, "1"). Translation module 106 may then replace hash "23456" with its associated prevalence rank (in this example, "1") for later consumption or use by a heuristic, as explained in greater detail below.

Alternatively, if analysis module 104 generates a file hash in step 304 that is not contained within frequency table 122 (e.g., file hash "89012"), then at step 306 translation module 106 may replace this file hash with a specific value (e.g., "FFFFF") that identifies this file hash as a unique or non-prevalent file hash.

In some examples, translation module 106 may translate a non-comparable value into a comparable value in step 306 without modifying the underlying algorithm or formula used to create the heuristic in question. For example, by identifying and translating non-comparable values associated with a corpus of files in real time (i.e., as the files are encountered by a heuristic, as opposed to pre-processing and sorting the files prior to consumption by the heuristic), translation module 106 may create specific and unique attributes for files without pre-processing the entire corpus of files.

Returning to FIG. 3, at step 308 the systems described herein may process the comparable value generated in step 306 in a heuristic. For example, heuristic-application module 108 in FIG. 1 may, as part of computing subsystem 202 in FIG. 2, process the new comparable value generated in step 306 by applying a heuristic to a file encountered within training data 124. Alternatively, translation module 106 may, as part of computing subsystem 206(1) in FIG. 2, process the comparable value generated in step 306 by applying a heuristic to a file encountered by a heuristic deployed on computing subsystem 206(1).

Heuristic-application module 108 may accomplish step 308 in a variety of ways. In one example, heuristic-application module 108 may process the comparable value generated in step 306 in a heuristic by: 1) applying a heuristic to the file identified in step 302 and then 2) determining, at least in part by comparing the comparable value generated in step 306 with a predetermined attribute value, whether the file identified in step 302 represents a malicious file. For example, heuristic-application module 108 may, as part of computing subsystem 202 in FIG. 2, apply a malware-detection decision tree to a file encountered within training data 124. In this example, the malware-detection decision tree may determine that the file represents a legitimate or trustworthy file if, among other criteria, the prevalence rank of a hash of a specific region of the file is less than or equal to three (e.g., a branch of the decision tree may contain the statement "file hash ≦3").

By translating non-comparable values (such as, for example, file hashes) into comparable values, the systems and methods described herein may enable decision trees and other heuristics to analyze traditionally non-comparable values without having to pre-process data samples and/or otherwise modify the underlying algorithms or formulas used to create the decision trees. As such, these systems and methods may effectively generate or identify new attributes for data objects (such as file-hash prevalence attributes) that may be useful, for example, in detecting or identifying malware.

Figure 5:
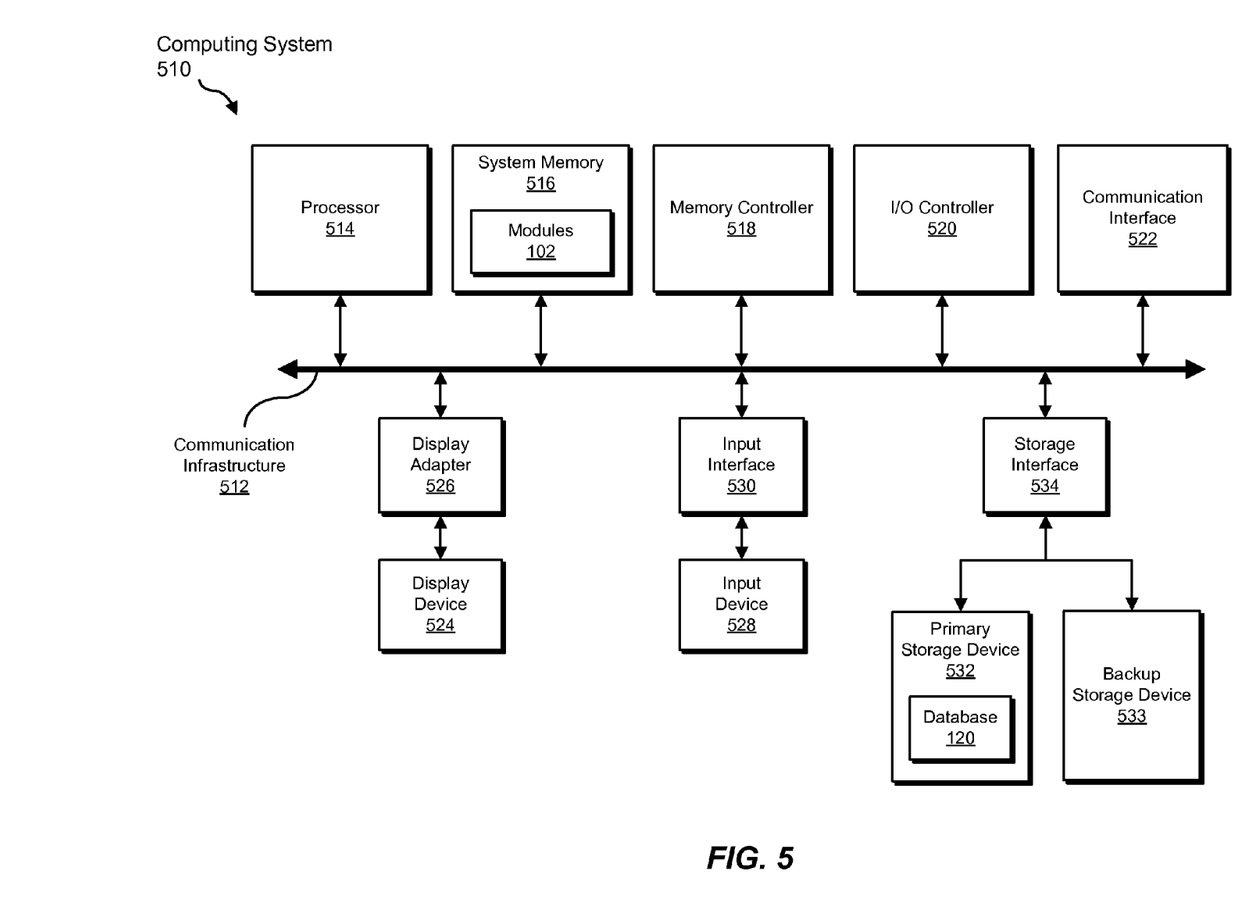
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, translating, processing, generating, replacing, accessing, determining, assigning, sorting, removing, and comparing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, translating, processing, generating, replacing, accessing, determining, assigning, sorting, removing, and comparing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, translating, processing, generating, replacing, accessing, determining, assigning, sorting, removing, and comparing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, translating, processing, generating, replacing, accessing, determining, assigning, sorting, removing, and comparing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, translating, processing, generating, replacing, accessing, determining, assigning, sorting, removing, and comparing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, translating, processing, generating, replacing, accessing, determining, assigning, sorting, removing, and comparing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
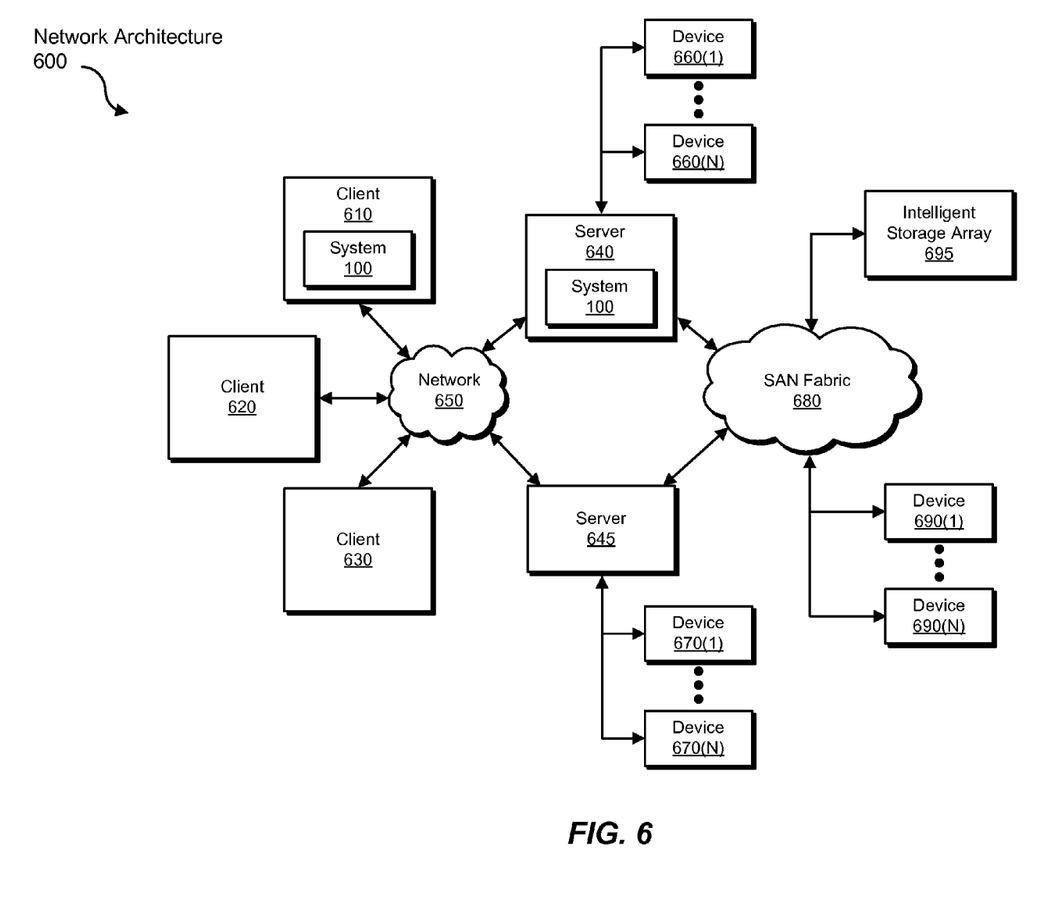
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, translating, processing, generating, replacing, accessing, determining, assigning, sorting, removing, and comparing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for translating non-comparable values into comparable values for use in heuristics. In one example, such a method may include: 1) identifying a data object, 2) identifying a non-comparable value associated with the data object, 3) translating the non-comparable value into a comparable value, and then 4) processing the comparable value in a heuristic. In some examples, the heuristic may include a malware-detection heuristic, such as a decision tree.

In some examples, the data object may represent a file and identifying a non-comparable value associated with the file may include generating a hash of at least a portion of the file. In this example, translating the non-comparable value into a comparable value may include replacing the hash with a prevalence rank that identifies the prevalence of the hash relative to other file hashes within a corpus of samples. The corpus of samples may include training data and/or field data.

In addition, translating the non-comparable value into a comparable value may include: 1) accessing a hash-frequency table that identifies the frequency of occurrence of each of a plurality file hashes within a corpus of samples, 2) determining, by analyzing the hash-frequency table, the prevalence of the hash relative to other file hashes within the hash-frequency table, 3) assigning a prevalence rank to the hash based on the prevalence of the hash relative to the other file hashes within the hash-frequency table, and then 4) replacing the hash with the prevalence rank.

The method may also include, prior to accessing the hash-frequency table, generating the hash-frequency table by: 1) identifying a plurality of files within the corpus of samples, 2) generating at least one file hash for each file within the corpus of samples, 3) determining the frequency of occurrence of each file hash, 4) sorting each file hash based on frequency of occurrence, and then 5) assigning a prevalence rank to each file hash based on the prevalence of the file hash relative to the other file hashes within the hash-frequency table. In this example, the method may also include removing, from the hash-frequency table, file hashes that occur less than a predetermined number of times.

In some examples, translating the non-comparable value into a comparable value may include translating the non-comparable value into the comparable value without modifying an algorithm used to create the heuristic. In addition, processing the comparable value in a heuristic may include applying the heuristic to the data object and then determining, at least in part by comparing the comparable value with a predetermined attribute value, whether the data object represents a malicious file. In this example, comparing the comparable value with the predetermined attribute value may include determining whether the comparable value is less than, greater than, or equal to the predetermined attribute value. The predetermined attribute value may include a prevalence rank that identifies the prevalence of a hash relative to other hashes within a corpus of samples.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, translation module 106 in FIG. 1 may transform a property or characteristic of database 120 by generating and then storing frequency table 122 in database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for translating non-comparable values into comparable values for use in heuristics, at least a portion of the method being performed by a computing device comprising at least one processor, the method comprising:
   identifying a file;
   identifying a non-comparable value associated with the file, wherein the non-comparable value comprises a hash of at least a portion of the file;
   translating the non-comparable value into a comparable value by:
      accessing a hash-frequency table that identifies the frequency of occurrence of each of a plurality file hashes within a corpus of samples;
      determining, by analyzing the hash-frequency table, the prevalence of the hash relative to other file hashes within the hash-frequency table;
      assigning a prevalence rank to the hash based on the prevalence of the hash relative to the other file hashes within the hash-frequency table; and
      replacing the hash with the prevalence rank; and
   processing the comparable value in a heuristic,
      wherein the processing the comparable value in the heuristic comprises:
      applying the heuristic to the file; and
      determining, at least in part by comparing the comparable value with a predetermined attribute value, whether the file represents a malicious file.

2. The method of claim 1, wherein identifying the non-comparable value associated with the file comprises generating the hash.

3. The method of claim 1, wherein the corpus of samples comprises at least one of:
   training data and
   field data.

4. The method of claim 1, further comprising, prior to accessing the hash-frequency table, generating the hash-frequency table by:
   identifying a plurality of files within the corpus of samples;
   generating at least one file hash for each file within the corpus of samples;
   determining the frequency of occurrence of each file hash;

sorting each file hash based on frequency of occurrence; and assigning a prevalence rank to each file hash based on the prevalence of the file hash relative to the other file hashes within the hash-frequency table.

5. The method of claim 4, further comprising removing, from the hash-frequency table, file hashes that occur less than a predetermined number of times.

6. The method of claim 1, wherein translating the non-comparable value into the comparable value further comprises translating the non-comparable value into the comparable value without modifying an algorithm used to create the heuristic.

7. The method of claim 1, wherein comparing the comparable value with the predetermined attribute value comprises determining at least one of:
whether the comparable value is less than the predetermined attribute value,
whether the comparable value is greater than the predetermined attribute value, and
whether the comparable value is equal to the predetermined attribute value.

8. The method of claim 7, wherein the predetermined attribute value comprises a prevalence threshold.

9. The method of claim 1, wherein the heuristic comprises a malware-detection heuristic.

10. The method of claim 1, wherein the heuristic comprises a decision tree.

11. A system for translating non-comparable values into comparable values for use in heuristics, the system comprising:
an analysis software module programmed to:
identify a file; and
identify a non-comparable value associated with the file, wherein the non-comparable value comprises a hash of at least a portion of the file;
a translation software module programmed to translate the non-comparable value into a comparable value by:
accessing a hash-frequency table that identifies the frequency of occurrence of each of a plurality file hashes within a corpus of samples;
determining, by analyzing the hash-frequency table, the prevalence of the hash relative to other file hashes within the hash-frequency table;
assigning a prevalence rank to the hash based on the prevalence of the hash relative to the other file hashes within the hash-frequency table; and
replacing the hash with the prevalence rank;
a heuristic-application software module programmed to process the comparable value in a heuristic, wherein the heuristic-application software module processes the comparable value in the heuristic by:
applying the heuristic to the file; and
determining, at least in part by comparing the comparable value with a predetermined attribute value, whether the file represents a malicious file; and
a processor configured to execute the analysis software module, the translation software module, and the heuristic-application software module.

12. The system of claim 11, wherein the analysis software module identifies the non-comparable value associated with the file by generating the hash.

13. The system of claim 12, wherein the translation software module is further programmed to generate the hash-frequency by:
identifying a plurality of files within the corpus of samples;
generating at least one file hash for each file within the corpus of samples;
determining the frequency of occurrence of each file hash;
sorting each file hash based on frequency of occurrence; and
assigning a prevalence rank to each file hash based on the prevalence of the file hash relative to the other file hashes within the hash-frequency table.

14. A computer-readable medium comprising computer-executable instructions that, when executed by at least one processor of a computing device, cause the computing device to:
identify a file;
identify a non-comparable value associated with the file, wherein the non-comparable value comprises a hash of at least a portion of the file;
translate the non-comparable value into a comparable value by:
accessing a hash-frequency table that identifies the frequency of occurrence of each of a plurality file hashes within a corpus of samples;
determining, by analyzing the hash-frequency table, the prevalence of the hash relative to other file hashes within the hash-frequency table;
assigning a prevalence rank to the hash based on the prevalence of the hash relative to the other file hashes within the hash-frequency table; and
replacing the hash with the prevalence rank; and
process the comparable value in a heuristic, wherein the process the comparable value in the heuristic comprises:
applying the heuristic to the file; and
determining, at least in part by comparing the comparable value with a predetermined attribute value, whether the file represents a malicious file.

* * * * *

UNITED STATES PATENT AND TRADEMARK OFFICE
CERTIFICATE OF CORRECTION

PATENT NO. : 8,381,302 B1  
APPLICATION NO. : 12/558845  
DATED : February 19, 2013  
INVENTOR(S) : Mark Kennedy and Abubakar Wawda Page 1 of 1

It is certified that error appears in the above-identified patent and that said Letters Patent is hereby corrected as shown below:

In the Claims:

Claim 1, at column 14, lines 37 to 39, should read:

accessing a hash-frequency table that identifies the frequency of occurrence of each of a plurality of file hashes within a corpus of samples;

Claim 14, at column 16, lines 25 to 28, should read:

A non-transitory computer-readable medium comprising computer-executable instructions that, when executed by at least one processor of a computing device, cause the computing device to:

Signed and Sealed this  
Eighteenth Day of June, 2013

Teresa Stanek Rea  
*Acting Director of the United States Patent and Trademark Office*